(12) United States Patent
Lee (10) Patent No.: US 8,233,223 B2
(45) Date of Patent: Jul. 31, 2012

(54) TELEPHOTO LENS SYSTEM AND PHOTOGRAPHING DEVICE INCLUDING THE SAME

(75) Inventor: Tae-kun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 12/706,046

(22) Filed: Feb. 16, 2010

(65) Prior Publication Data

US 2010/0231781 A1  Sep. 16, 2010

(30) Foreign Application Priority Data

Mar. 13, 2009 (KR) .................. 10-2009-0021851

(51) Int. Cl.
*G02B 13/02* (2006.01)
(52) U.S. Cl. ........................................ 359/748
(58) Field of Classification Search .......... 359/745, 359/748, 756, 757, 759; 348/345
See application file for complete search history.

(56) References Cited

U.S. PATENT DOCUMENTS 7,626,771 B2 * 12/2009 Yokoyama ............. 359/754

FOREIGN PATENT DOCUMENTS

| JP | 08-304698 A | 11/1996 |
| JP | 08-327897 A | 12/1996 |
| JP | 11-119092 A | 4/1999 |

* cited by examiner

*Primary Examiner* — Alicia M Harrington
(74) *Attorney, Agent, or Firm* — Drinker Biddle & Reath LLP

(57) ABSTRACT

A telephoto lens system and a photographing device including the telephoto lens system. The telephoto lens system includes a first lens group having a positive refractive power, a second lens group having a negative refractive power, and a third lens group having a positive refractive power, which are sequentially disposed from an object side, wherein the second lens group performs focusing, and the third lens group includes a front lens group having a negative refractive power and a back lens group having a positive refractive power, and vibration correction is performed by moving the front lens group of the third lens group in a perpendicular direction to the optical axis.

22 Claims, 4 Drawing Sheets

TELEPHOTO LENS SYSTEM AND PHOTOGRAPHING DEVICE INCLUDING THE SAME

CROSS-REFERENCE TO RELATED PATENT APPLICATION

This application claims the benefit of Korean Patent Application No. 10-2009-0021851, filed on Mar. 13, 2009, in the Korean Intellectual Property Office, the disclosure of which is incorporated herein in its entirety by reference.

BACKGROUND OF THE INVENTION

1. Field of the Invention

The present invention relates to a telephoto lens system having a large aperture and including a vibration correction function, and a photographing device including the telephoto lens system.

2. Description of the Related Art

Digital cameras or video cameras including an image sensor, such as a charge coupled device (CCD) or complementary metal oxide semiconductor (CMOS) are now widely used. In particular, demand for camera modules having mega pixel resolution has increased and cameras having 10 million or more pixels and high image quality are emerging.

An object at a far distance can be photographed using a telephoto lens system. However, in a telephoto lens system that has a long focal length, an image captured may appear blurry due to vibration. Vibration generated due to fine tremor of hands and generated during a photographing operation may decrease quality of photographed images. In particular, a telephoto lens system has a long focal length, and thus a shift in image positions due to vibration may be large. Accordingly, in a telephoto lens system, vibration correction is required. Also, when a lens group for correcting vibration is designed, space for installing an instrument for driving a vibration correction lens group and the compact size of the vibration correction lens group need to be considered at the same time.

SUMMARY OF THE INVENTION

An embodiment of the invention provides a telephoto lens system having a large aperture and is capable of correcting vibration.

An embodiment of the invention also provides a photographing device including a telephoto lens system having a large aperture, and is capable of correcting vibration.

According to an embodiment of the invention, there is provided a telephoto lens system comprising a first lens group having a positive refractive power, a second lens group having a negative refractive power, and a third lens group having a positive refractive power that are sequentially disposed from the object side, wherein the second lens group performs focusing, and the third lens group includes a front lens group having a negative refractive power and a back lens group having a positive refractive power, and vibration correction is performed by moving the front lens group of the third lens group in a direction perpendicular to the optical axis, wherein the first lens group includes at least three lenses having a positive refractive power, and the at least three lenses having a positive refractive power satisfy the conditions below $$V(G1) \geq 70,$$

$$150 < \phi FNO < 400,$$

where $V(G1)$ denotes an Abbe number of one of the lenses having a positive refractive power included in the first lens group, $\phi$ denotes the effective diameter of the lens disposed closest to the image side among the lenses having a positive refractive power, and FNO denotes an F-Number of the overall telephoto lens system.

The first lens group, the second lens group, and the third lens group may satisfy the condition below $$-0.6 < F/f31 < -0.2,$$

where F is the focal length of the overall telephoto lens system, and f31 is the combined focal length of the first lens group, the second lens group and the front lens group of the third lens group.

According to another embodiment of the invention, there is provided a telephoto lens system comprising a first lens group having a positive refractive power, a second lens group having a negative refractive power, and a third lens group having a positive refractive power that are sequentially disposed from the object side, wherein the second lens group performs focusing, and the third lens group includes a front lens group having a negative refractive power and a back lens group having a positive refractive power, and vibration correction is performed by moving the front lens group of the third lens group in a direction perpendicular to the optical axis, wherein the first lens group includes at least three lenses having a positive refractive power, and the at least three lenses having a positive refractive power satisfy the condition below $$-0.6 < F/f31 < -0.2,$$

where F is the focal length of the overall telephoto lens system, and f31 is the combined focal length of the first lens group, the second lens group and the front lens group of the third lens group.

The first lens group and the second lens group may satisfy the conditions below $$0.4 < F1/F < 0.7$$

$$0.15 < |F1*F2/F| < 0.30,$$

where F is the focal length of the overall telephoto lens system, F1 is the focal length of the first lens group, and F2 is the focal length of the second lens group.

The third lens group may satisfy the condition below $$0.6 < F3/F < 0.9,$$

where F is the focal length of the overall telephoto lens system, and F3 is the focal length of the third lens group.

The third lens group may satisfy the condition below $$0.6 < F3/F < 0.9,$$

where F is the focal length of the overall telephoto lens system, and F3 is the focal length of the third lens group.

The front lens group of the third lens group may satisfy the condition below $$-4.0 < m31 < -0.7,$$

where m31 is the magnification of the front lens group of the third lens group with respect to an infinite object distance.

The back lens group of the third lens group may satisfy the condition below $$-0.6 < m32 < -0.1,$$

where m32 is the magnification of the back lens group of the third lens group with respect to an infinite object distance.

The front lens group of the third lens group may include at least one positive lens, at least one negative lens, and a biconvex air lens, and the telephoto lens system may satisfy the condition below $$-0.4 < Fair/F < -0.15,$$

where Fair is the focal length of the air lens and F is the focal length of the overall telephoto lens system.

The telephoto lens system may satisfy the condition below $$0.7 < Fair/F31 < 1.4,$$

where Fair is the focal length of the biconvex air lens, and F31 is the focal length of the front lens group of the third lens group.

The telephoto lens system may satisfy the condition below $$30 < Vp(G32) - Vn(G32) < 60,$$

where Vp(G32) is an Abbe number of the at least one positive lens of the back lens group of the third lens group, and Vn(G32) is an Abbe number of the at least one negative lens of the back lens group of the third lens group.

According to another embodiment of the invention, there is provided a photographing device comprising: a telephoto lens system; and an imaging sensor receiving an image formed by the telephoto lens system, wherein the telephoto lens system comprises a first lens group having a positive refractive power, a second lens group having a negative refractive power, and a third lens group having a positive refractive power that are sequentially disposed from the object side, wherein the second lens group performs focusing, and the third lens group includes a front lens group having a negative refractive power and a back lens group having a positive refractive power, and vibration correction is performed by moving the front lens group of the third lens group in a direction perpendicular to the optical axis, wherein the first lens group includes at least three lenses having a positive refractive power, and the at least three lenses having a positive refractive power satisfy the conditions below $$V(G1) \geq 70,$$

$$150 < \phi FNO < 400,$$

where V(G1) denotes an Abbe number of one of the lens having a positive refractive power included in the first lens group, φ denotes the effective diameter of the lens disposed closest to the image side among the lenses having a positive refractive power, and FNO denotes the F-Number of the overall telephoto lens system.

According to another embodiment of the invention, there is provided a photographing device comprising: a telephoto lens system; and an imaging sensor receiving an image formed by the telephoto lens system, wherein the telephoto lens system comprises a first lens group having a positive refractive power, a second lens group having a negative refractive power, and a third lens group having a positive refractive power that are sequentially disposed from the object side, wherein the second lens group performs focusing, and the third lens group includes a front lens group having a negative refractive power and a back lens group having a positive refractive power, and vibration correction is performed by moving the front lens group of the third lens group in a direction perpendicular to the optical axis, wherein the first lens group includes at least three lenses having a positive refractive power, and the first lens group, the second lens group, and the third lens group satisfy the condition below $$-0.6 < F/f31 < -0.2,$$

where F is the focal length of the overall telephoto lens system, and f31 is the combined focal length of the first lens group, the second lens group and the front lens group of the third lens group.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
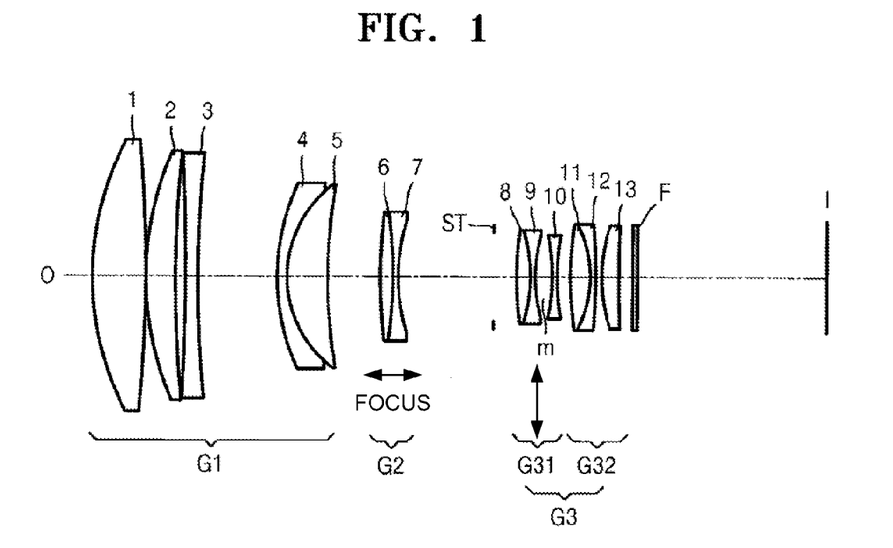
FIG. 1 is a schematic view illustrating a telephoto lens system according to an embodiment of the invention.

FIG. 1 is a schematic view illustrating a telephoto lens system according to an embodiment of the invention. Referring to FIG. 1, the telephoto lens system includes, sequentially from an object side (O), a first lens group G1 having a positive refractive power, a second lens group G2 having a negative refractive power, and a third lens group G3 having a positive refractive power. The first lens group G1 includes at least three lenses having a positive refractive power and corrects chromatic aberration. The second lens group G2 performs focusing according to variations in distances of objects. By moving from the object side (O) to an image side (I), the second lens group G2 performs focusing within a distance from an unlimited object distance to a minimum distance. The third lens group G3 includes a front lens group G31 having a negative refractive power and a back lens group G32 having a positive refractive power, and vibration is corrected by moving the front lens group G31 of the third lens group G3 in a direction perpendicular to the optical axis.

According to an embodiment of the invention, a lens group for correcting vibration is included in a telephoto lens system that has a long focal length to improve the optical performance of the telephoto lens system. Also, a light-weight moving lens group for focusing and a light-weight moving lens group for correcting vibration simplifies movement. In the telephoto lens system according to the current embodiment of the present invention, the front lens group G31 of the third lens group G3 having a minimum effective diameter is used as a vibration correction lens group. Thus, a telephoto lens system having a light-weight vibration correction lens group may be realized.

According to this embodiment, appropriate sensitivity required for the vibration correction lens group is provided, aberration change due to movement of the vibration correction lens group is prevented, additional change in focusing that may be generated due to the movement of the vibration correction lens group along an optical axis direction is minimized, and inclination of an image plane due to the inclination of the vibration correction lens group is minimized.

Meanwhile, a back side insertion type optical filter F is included at the image side I of the back lens group G32 of the third lens group G3. Since an effective diameter of the object side O of the first lens group G1 is large, it is difficult to use an interchangeable optical filter, and thus the insertion type optical filter F is used.

The telephoto lens system according to this embodiment may use an inner focusing method. In the case of a large aperture telephoto lens system that uses an inner focusing method, the refractive power of each of lens groups needs to be optimized in order to maintain optical performance irrespective of variation in distances of objects to be photographed. The first lens group G1 has a positive refractive power and corrects chromatic aberration, and collimates light at the same time, in order to reduce the effective diameter of the lens system, and the second lens group G2 enables quick focusing. Also, the front lens group G31 of the third lens group G3 has an effective diameter that is reduced by the first lens group G1 may be a light weight, and thus the size of a vibration correction mechanism and an actuator may be reduced. The back lens group G32 of the third lens group G3 controls aberration caused by the movement of the front lens group G31, and controls distortion of the overall telephoto lens system, thereby collimating light onto the image plane.

According to the current embodiment, the first lens group G1 includes at least three lenses having a positive refractive power, thereby distributing a positive refractive power properly. Accordingly, fluctuation in high-degree spherical aberration with respect to a movement of the second lens group G2 along the optical axis for focusing is prevented. Also, the at least three lenses having a positive refractive power are formed of a material that satisfies Inequalities 1 and 2 below to reduce chromatic aberration.

$$V(G1) \geq 70 \quad \text{[Inequality 1]}$$

$$150 < \phi FNO < 400 \quad \text{[Inequality 2]}$$

In Inequality 1, V(G1) is an Abbe number of one of the lenses having a positive refractive power included in the first lens group G1. In Inequality 2, $\phi$ denotes the effective diameter of the lens that is closest to the image side I among the lenses having a positive refractive power of the first lens group G1, and FNO denotes an F-Number of the overall telephoto lens system. By satisfying Inequality 1, a focus with respect to a light flux having a C line (656.27 nm) and a light flux along an F line (486.13 nm) is unified on the image plane among light fluxes incident on an object at a predetermined distance, to reduce chromatic aberration. Also, by satisfying Inequality 1, good chromatic aberration performance is maintained with respect to a distance range from an unlimited object distance to a very close object distance. Also, by satisfying Inequality 2, a large aperture lens having a small F-Number is provided, and excellent chromatic aberration performance is maintained irrespective of a height of light flux. To this end, at least three positive lenses formed of a low dispersion material having an Abbe number of 70 or greater are used to adjust the focuses of the C line and the F line. Meanwhile, in order to focus with respect to a g line (435.83 nm), even though satisfying Inequality 1, at least three positive lenses may be formed of a material having a partial dispersion of less than 0.55. Also, instead of designing the at least three positive lenses to satisfy Inequality 1, a diffraction refractive lens may be used to remove chromatic aberration.

By satisfying Inequality 2, chromatic aberration can be effectively corrected and the length of the overall telephoto lens system can be reduced, and an effective diameter of the second lens group G2 can be reduced and an appropriate refractive power of the second lens group G2 can be obtained at the same time. Accordingly, aberration can be sufficiently corrected by using two light-weight lenses. When $\phi$FNO is less than the lower limit of Inequality 2, it is difficult to correct chromatic aberration according to a height of light flux and thus it is difficult to obtain a beautiful motion blur effect, and at least three lenses are needed for the second lens group G2. When $\phi$FNO is greater than the upper limit of Inequality 2, the overall length of the lenses is too large or the effective diameter of the second lens group G2 becomes too large, and thus the mass of the second lens group G2 is increased or a telephoto lens system having an F-Number of about 2.8 is difficult to design.

According to an embodiment of the invention, chromatic aberration is efficiently removed as the first lens group G1 includes two lenses having a negative refractive power. The lenses having a negative refractive power may preferably be formed of a material having an Abbe number that is 30 or greater and 50 or less. For example, the first lens group G1 of the telephoto lens system illustrated in FIG. 1 may include a first lens 1, a second lens 2, a third lens 3, a fourth lens 4, and a fifth lens 5; the first lens 1, the third lens 3, and the fifth lens 5 may have a positive refractive power, and the second lens 2 and the fourth lens 4 may have a negative refractive power. The second lens group G2 may include a sixth lens 6 and a seventh lens 7. The front lens group G31 of the third lens group G3 may include an eighth lens 8, a ninth lens 9, and a tenth lens 10, and the back lens group G32 of the third lens group G3 may include an eleventh lens 11, a twelfth lens 12, and a thirteenth lens 13.

Meanwhile, the front lens group G31 of the third lens group G3 may satisfy Inequality 3 below:

$$-0.6 < F/f31 < -0.2, \quad \text{[Inequality 3]}$$

where F denotes the focal length of the overall telephoto lens system, and f31 denotes the combined focal length of the first lens group G1, the second lens group G2 and the front lens group G31 of the third lens group G3. Inequality 3 defines refractive power of the vibration correction lens group. In the first lens group G1, light is collimated with large refractive power, and by adjusting the refractive power of the second lens group G2, an effective diameter is minimized at a position of the front lens group G31 of the third lens group G3. Variation in incident and exit angles of the light flux is maintained to be small so that aberration is minimized with respect to movement of the front lens group G31. When F/f31 is less than the lower limit of Inequality 3, when the front lens group G31 moves in a direction perpendicular to the optical axis to correct for vibration, it is difficult to correct eccentric aberration. When F/f31 is greater than the upper limit of Inequality 3, the amount of corrected vibration on the image plane is less than an amount of movement of the front lens group G31 in a direction perpendicular to the optical axis, that is, correction sensitivity is reduced, and thus the amount of movement of the front lens group G31 for correcting vibration is increased. As the amount of movement of the front lens group G31 for correcting vibration is increased, it is difficult to construct a vibration correction mechanism and an actuator.

Inequality 4 expresses a ratio of a focal length F1 of the first lens group G1 with respect to the overall focal length F.

$$0.4 < F1/F < 0.7 \quad \text{[Inequality 4]}$$

Inequality 4 is related to reduction in the weight of the overall telephoto lens system, reduction in the length of the overall telephoto lens system, correction of aberration on the entire screen, reduction in the effective diameter of the second lens group G2, and focusing sensitivity of the second lens group G2. According to optical paraxial theory, when the refractive power of the first lens group G1 is increased and thus the focal length F1 of the first lens group G1 is reduced, focusing sensitivity may be increased by the movement of the second lens group G2 along the optical axis. Accordingly, the amount of movement of the second lens group G2 needed for focusing may be reduced, and thus a focusing mechanism having a simple structure may be formed and focusing may be performed at high speed. Also, when the refractive power of the first lens group G1 is large and thus the focal length F1 of the first lens group G1 is reduced, the length of the overall telephoto lens system is reduced and the effective diameter of the second lens group G2, which performs focusing, may also be reduced. However, when the refractive power of the first lens group G1 is increased, the refractive power of the second lens group G2 is increased accordingly, and the aberration of the overall telephoto lens system is increased. Accordingly, Inequality 4 needs to be satisfied in order to reduce the length of the overall telephoto lens system without a decrease in the performance thereof, to reduce the effective diameter of the second lens group G2 and to obtain proper focusing sensitivity.

In Inequality 4, when F1/F is less than the lower limit, the length of the overall telephoto lens system is reduced but the focusing sensitivity according to the movement of the second lens group G2 along the optical axis becomes too high and thus it is difficult to precisely adjust focus. Also, coma in the g-line is increased and meridional image plane correction becomes difficult, and thus the aberration of the overall telephoto lens system is increased, distortion is excessively corrected, and change in the aberration with respect to change in the object distance is intensified, and thus a short closest distance cannot be provided. When F1/F is greater than the upper limit of Inequality 4, the length of the overall telephoto lens system is increased, the mass of the overall telephoto lens system is increased, and the amount of movement of the second lens group G2 needed for focusing is increased, and the size of the effective diameter of the second lens group G2 is increased, thereby increasing the size of the focusing instrument.

Next, the first lens group G1 and the second lens group G2 may be configured to satisfy Inequality 5 below.

$$0.15 < |F1*F2/F| < 0.30 \quad \text{[Inequality 5]}$$

Inequality 5 defines the refractive power of the second lens group G2, and within the range of Inequality 5, the performance of the telephoto lens system is maintained during focusing with respect to an object at an unlimited distance to an object at a closest distance. When the refractive power of the second lens group G2 is less than the lower limit of Inequality 5, spherical aberration is excessively corrected, and it is difficult to correct spherical aberration regarding various object distances during focusing, and thus a short minimum distance cannot be provided. Also, if a lens is added to the second lens group G2 or the third lens group G3, a compact size of the telephoto lens system cannot be obtained. When the refractive power of the second lens group G2 is greater than the upper limit of Inequality 5, the amount of movement of the second lens group G2 needed for focusing is increased, and a large space is required for movement. Accordingly, the length of the overall telephoto lens system is increased, and a short minimum distance cannot be provided due to the limited space for movement. In addition, the effective diameter of the second lens group G2 is increased, and accordingly, the mass of the second lens group G2 is also increased, the load of a driving unit needed for moving the lenses of the second group G2 is increased, and a driving unit having a large size is required.

Next, the third lens group G3 may be configured to satisfy Inequality 6 below.

$$0.6 < F3/F < 0.9 \quad \text{[Inequality 6]}$$

Here, F3 denotes the focal length of the third lens group G3. Inequality 6 relates to the refractive power of the third lens group G3, and is an important factor for providing a back focal length (BFL). The telephoto lens system according to the current embodiment of the invention may be used as an interchangeable lens system for a photographing device for capturing AV data, such as a single-lens reflex (SLR) still camera, a digital SLR (DSLR) still camera, or a rangefinder (RF) still camera. An SLR still camera requires a physical space called a flange back of about 40-50 mm from the image plane to a mount. In addition, an insertion type filter may be frequently installed between a lens back side of and a lens mount of the telephoto lens system. Also, frequently, a converter lens for lengthening a focal length may be mounted between the lens mount and a body mount. Accordingly, due to this reason, a long BFL is required in the telephoto lens system. When Inequality 6 is less than the lower limit, the length of the overall telephoto lens system is reduced but the BFL is also reduced. In contrast, when Inequality 6 is greater than the upper limit, the length of the overall telephoto lens system is increased, and the effective diameter of the first lens group G1 is also increased.

By satisfying Inequalities 3 through 6 above, and by performing focusing by moving the second lens group G2, light can be collimated with small chromatic aberration by using the first lens group G1, and appropriate focusing sensitivity may be obtained with the small effective diameter of the second lens group G2. Also, when moving the front lens group G31 of the third lens group G3 in a direction perpendicular to the optical axis for correcting vibration, variation in optical aberration is kept to be small, and the back lens group G32 effectively prevents residual aberration due to vibration correction. Also, even though the front lens group G31 of the third lens group G3 moves a small amount, the amount of movement of an image on the image plane is large enough at an appropriate degree such that the amount of movement of the front lens group G31 for correcting vibration does not have to be large.

Meanwhile, according to the current embodiment, some of the lenses of the third lens group G3 are moved in a direction perpendicular to the optical axis to correct vibration. When vibration correction is performed in this manner, the mass and the effective diameter of the vibration correction lens group need to be small. To satisfy this requirement, the refractive power of the first lens group G1 is maximized while maintaining the efficiency of the telephoto lens system, and also, the refractive power of the first lens group G1 is distributed so as to converge a light flux that has passed through the second lens group G2. Thus, the height of the light flux of the front lens group G31 of the third lens group G3, which performs vibration correction, is low. Accordingly, the mass of the vibration correction lens group is also kept low.

Next, image plane correction sensitivity of the vibration correction lens group needs to be controlled by a correction controlling unit. When the image plane correction sensitivity is high, control precision is limited, and when the correction sensitivity is low, a range of movement displacement is limited. Thus the image plane correction sensitivity needs to be set to comply with the requirement ranges of both of the correction instrument and the correction controlling unit. Decenter sensitivity $\beta$ of the vibration correction lens group may preferably be in a range of $1 < |\beta| < 2$. If $|\beta|$ is less than 1, a movement amount of the vibration correction lens group is increased, and a movement speed thereof is also increased. If $|\beta|$ is greater than 2, the vibration correction lens group needs to be controlled very precisely. When a magnification of the front lens group G31 with respect to an infinite object distance is m31, and a magnification of the back lens group G32 with respect with respect to an infinite object distance is m32, the decenter sensitivity $\beta$ can be expressed as: $\beta=(1-m31)*m32$. According to the current embodiment, the vibration correction lens group has a negative refractive power, and thus the vibration correction lens group may be configured to satisfy a condition of $-2<(1-m31)*m32<-1$.

Next, sensitivity with respect to movement of the vibration correction lens group along the optical axis is referred to as focusing sensitivity. Generally, a size of a permissible circle of confusion of a 35 mm Full Size sensor format is 30 um, and that of an APS-C standard sensor is 20 um. The telephoto lens system according to the current embodiment of the present invention can be applied to all photographing devices in which a Full Size sensor or an APS-C standard sensor is mounted, and can also be applied to a Super 35 standard photographing device, which uses a photography standard for photographing moving images. Thus, according to the current embodiment, a permissible circle of confusion of 20 um, which is applicable to all of these standards, will be used. Also when the vibration correction lens group moves in a direction perpendicular to the optical axis, the vibration correction lens group needs to be able to move about ±30 um in a direction of the optical axis due to basic tolerance of the correction instrument. Here, in order to satisfy a range corresponding to (Depth of Focus)/3 of an approximately 20 um permissible circle of confusion, a focusing sensitivity p of the vibration correction lens group needs to satisfy a condition of $|\rho|<0.6$. According to the current embodiment of the present invention, as the vibration correction lens group has a negative refractive power, the focusing sensitivity p is set to satisfy a condition of $-0.6<\rho<0$. Here, $\rho=(1-m31^2)*m32^2$, and thus the vibration correction lens group may have focusing sensitivity $\rho$ that satisfies the condition of $-0.6<(1-m31^2)*m32^2<0$.

In summary, the magnification m31 of the front lens group G31 of the third lens group G3 and the magnification m32 of the back lens group G32 of the third lens group G3 need to satisfy Inequalities 7 and 8 below:

$$-2<(1-m31)*m32<-1 \quad \text{[Inequality 7]}$$

$$-0.6<(1-m31^2)*m32^2<0 \quad \text{[Inequality 8]}$$

The magnifications m31 and m32 satisfying Inequalities 7 and 8 are as follows:

$$-4.0<m31<-0.7 \quad \text{[Inequality 9]}$$

$$-0.6<m32<-0.1 \quad \text{[Inequality 10]}$$

Here, m31 is the magnification of the front lens group G31 with respect to an infinite object distance, and m32 is the magnification of the back lens group G32 regarding an unlimited object distance. As the magnifications m31 and m32 are in the ranges of Inequalities 9 and 10, the decenter sensitivity $\beta$ and the focusing sensitivity $\rho$ of the vibration correction lens group can be satisfied.

Meanwhile, eccentric aberrations that are caused when moving the vibration correction lens group, such as eccentric coma aberration, aberration, eccentric image plane curvature, and so forth need to be corrected. For example, the front lens group G31 of the third lens group G3 may include at least one positive lens, at least one negative lens, and a biconvex air lens. Referring to FIG. 1, an air lens m may be included between the ninth lens 9 and the tenth lens 10. The air lens m having a focal length referred to as Fair may satisfy conditions below:

$$-0.4<\text{Fair}/F<-0.15, \quad \text{[Inequality 11]}$$

$$0.7<\text{Fair}/F31<1.4, \quad \text{[Inequality 12]}$$

where F is the overall focal length, and F31 is the focal length of the front lens group G31 of the third lens group G3. By satisfying Inequalities 11 and 12, eccentric aberration caused by vibration correction can be corrected.

The back lens group G32 of the third lens group G3 includes at least one positive lens and at least one negative lens. When an Abbe number of the at least one positive lens of the back lens group G32 is referred to as Vp(G32) and an Abbe number of the at least one negative lens is referred to as Vn(G32), the back lens group G32 may be constructed to satisfy a condition below:

$$30 \leq Vp(G32)-Vn(G32) \leq 60 \quad \text{[Inequality 13]}$$

As the back lens group G32 of the third lens group G3 satisfies Inequality 13, residual chromatic aberration can be corrected. The front and back lens groups G31 and G32 can effectively correct eccentric aberrations generated during vibration correction of the telephoto lens system by including at least one positive lens and at least one negative lens.

In general, eccentric aberration is determined by an amount of residual aberration with respect to light rays that are incident to or emitted from each of the lens groups. In order to effectively correct eccentric aberration, refractive power of each of the lens groups and the amount of residual aberration of each of the lens groups need to be set appropriately. Each of the front and back lens groups G31 and G32 of the third lens group G3 includes at least one positive lens and at least one negative lens to offset the residual aberration.

Meanwhile, the second lens group G2 includes at least one positive lens and at least one negative lens to remove residual aberration generated by movement of the vibration correction lens group. For example, the second lens group G2 includes a cemented lens that is formed of a positive biconvex lens and a negative biconcave lens. Referring to FIG. 1, the sixth lens 6 may be a positive biconvex lens, and the seventh lens 7 may be a negative biconcave lens. The second lens group G2 is moved to perform focusing, and needs to have small aberration fluctuation. To this end, radiuses of curvature R1, R2, and R3 of each of lens surfaces of the second lens group G2 are set to satisfy a condition below to thereby correct aberration during movement of the second lens group G2.

$$|R1| \leq |R2| \leq |R3| \quad \text{[Inequality 14]}$$

Also, an Abbe number of the negative lens of the second lens group G2 is set to be larger than an Abbe number of the positive lens thereof, thereby correcting residual chromatic aberration that is left after the correction of the first lens group G1.

Hereinafter, a telephoto lens system according to embodiments of the invention will be described. In the embodiments, EFL is a focal length of the overall telephoto lens system, Fno is an F-Number, w is a semi-angle of view (corresponds to 35 mm Film Size), 2 w is an angle of view, Surf is a lens surface, ST is an aperture stop, Radius is a radius of curvature of a lens, Thick is a lens thickness or an air gap, Ind is a refractive index of the lens, Abv is an Abbe number of the lens, and the refractive index and the Abbe number are based on d-Line ($\lambda=587.56$ nm).

<First Embodiment>

| EFL: 292.16 mm | Fno: 2.88 | 2w: 8.5 |
|---|---|---|

| Surf | Radius | Thick | Ind | Abv |
|---|---|---|---|---|
| 1 | 112.640 | 20.26 | 1.497 | 81.6 |
| 2 | -675.530 | 0.50 | | |
| 3 | 125.538 | 10.81 | 1.497 | 81.6 |
| 4 | 400.966 | 4.02 | | |
| 5 | -1054.000 | 4.60 | 1.8061 | 40.7 |
| 6 | 346.222 | 30.71 | | |
| 7 | 85.240 | 3.50 | 1.744 | 44.9 |
| 8 | 44.107 | 15.64 | 1.497 | 81.6 |
| 9 | 197.373 | 19.79 | | |
| 10 | 213.977 | 4.24 | 1.80518 | 25.5 |
| 11 | -213.977 | 2.30 | 1.883 | 40.8 |
| 12 | 72.366 | 36.51 | | |
| ST | Infinity | 8.50 | | |
| 14 | 106.420 | 5.10 | 1.84666 | 23.8 |
| 15 | -67.380 | 1.78 | 1.69895 | 30.1 |
| 16 | 54.500 | 6.60 | | |
| 17 | -89.481 | 1.80 | 1.48749 | 70.4 |
| 18 | 92.081 | 5.00 | | |
| 19 | 117.173 | 7.80 | 1.834 | 37.3 |
| 20 | -44.418 | 1.80 | 1.84666 | 23.8 |
| 21 | -233.292 | 2.32 | | |
| 22 | 69.994 | 6.50 | 1.48749 | 70.4 |
| 23 | 546.748 | 5.00 | | |
| 24 | Infinity | 2.00 | 1.5168 | 64.2 |
| 25 | Infinity | 72.52 | | |
| IMG | | | | |

Figure 2:
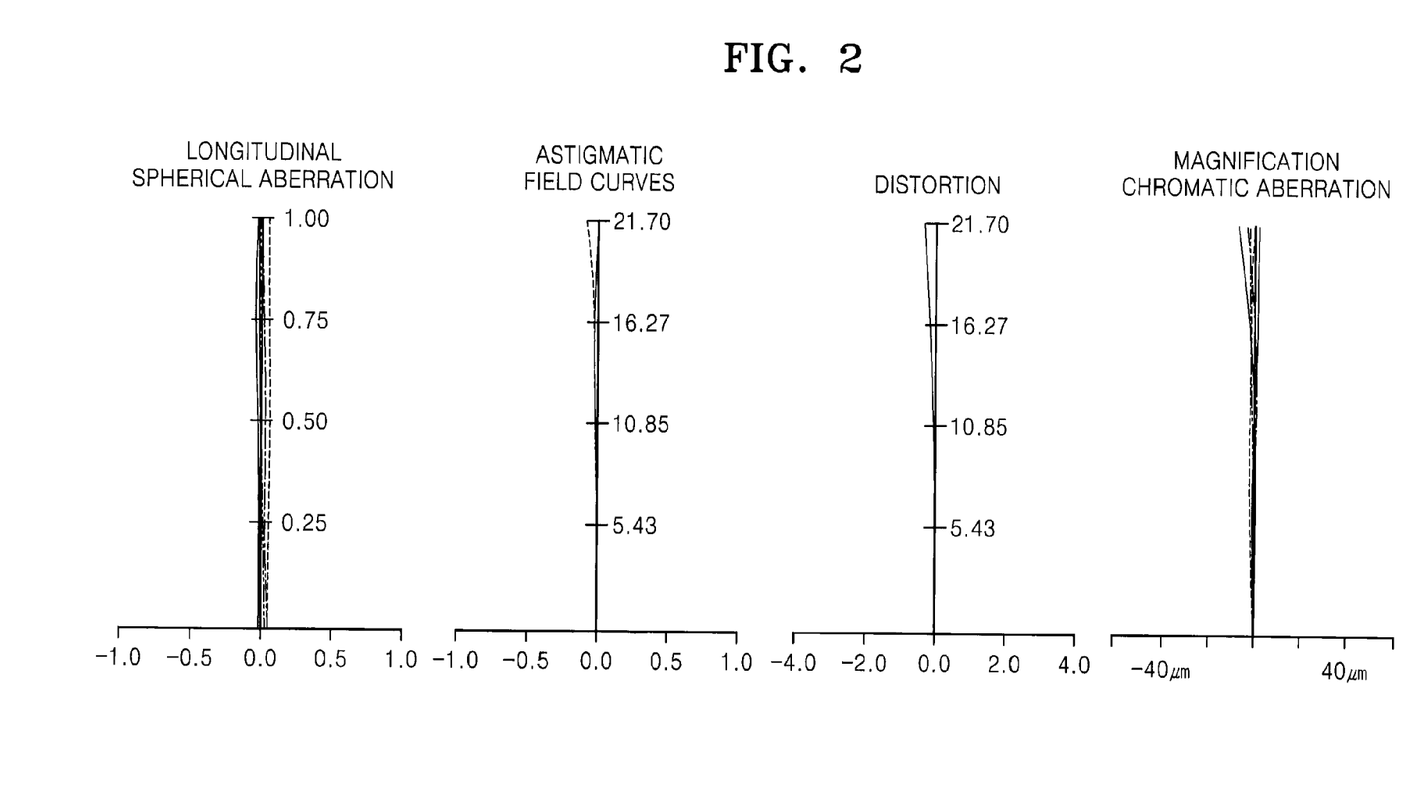
FIG. 2 is graphs spherical aberration, astigmatic field curves, distortion, and magnification chromatic aberration of the telephoto lens system of FIG. 1.
Figure 3:
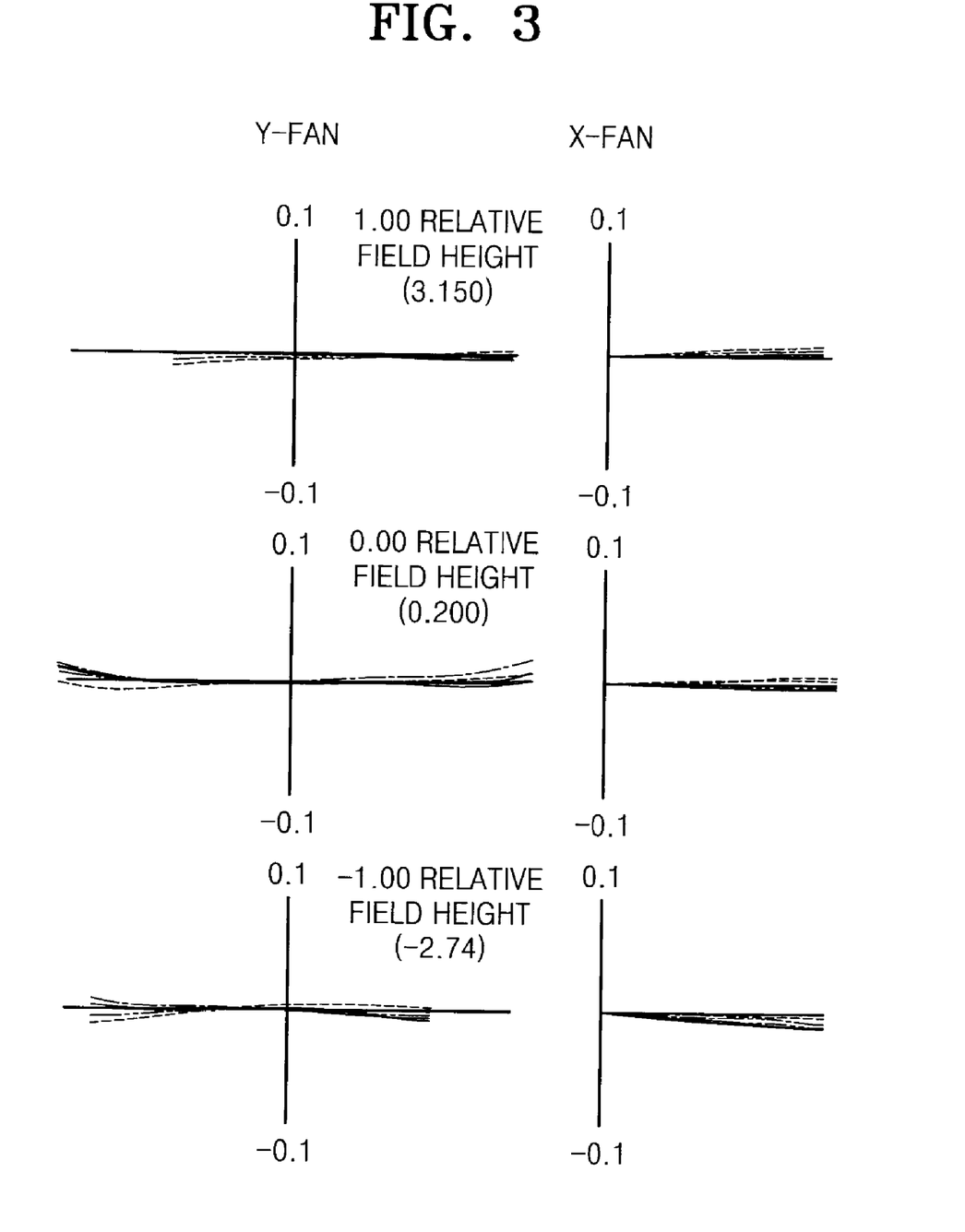
FIG. 3 is graphs showing a longitudinal aberration of the telephoto lens system of FIG. 1 according to vibration correction.

Meanwhile, FIG. 2 shows spherical aberration, astigmatic field curves, distortion, and magnification chromatic aberration of the telephoto lens system of the first embodiment. FIG. 3 shows a longitudinal aberration of the telephoto lens system of the first embodiment.

<Second Embodiment>

| EFL: 292.00 mm | Fno: 2.88 | 2w: 8.5 |
|---|---|---|

| Surf | Radius | Thick | Ind | Abv |
|---|---|---|---|---|
| 1 | 112.965 | 20.08 | 1.497 | 81.6 |
| 2 | -686.239 | 4.82 | | |
| 3 | 116.263 | 11.74 | 1.497 | 81.6 |
| 4 | 400.100 | 3.58 | | |
| 5 | -1053.985 | 5.00 | 1.8061 | 40.7 |
| 6 | 272.973 | 28.46 | | |
| 7 | 86.188 | 4.18 | 1.744 | 44.9 |
| 8 | 44.616 | 16.00 | 1.497 | 81.6 |
| 9 | 271.158 | 19.51 | | |
| 10 | 207.626 | 4.18 | 1.80518 | 25.5 |
| 11 | -207.626 | 2.30 | 1.883 | 40.8 |
| 12 | 67.948 | 33.40 | | |
| ST | Infinity | 5.00 | | |
| 14 | 103.029 | 4.50 | 1.84666 | 23.8 |
| 15 | -103.029 | 2.56 | | |
| 16 | -103.540 | 2.00 | 1.72825 | 28.3 |
| 17 | 53.882 | 5.19 | | |
| 18 | -67.063 | 2.00 | 1.48749 | 70.4 |
| 19 | 99.868 | 3.50 | | |
| 20 | 114.708 | 8.00 | 1.8061 | 33.3 |
| 21 | -37.378 | 3.00 | 1.84666 | 23.8 |
| 22 | -178.368 | 1.36 | | |
| 23 | 82.529 | 3.96 | 1.48749 | 70.4 |
| 24 | -265.616 | 5.00 | | |
| 25 | Infinity | 2.00 | 1.5168 | 64.2 |
| 26 | Infinity | 72.51 | | |
| IMG | | | | |

<Third Embodiment>

| EFL: 292.00 mm | Fno: 2.88 | 2w: 8.5 |
|---|---|---|

| Surf | Radius | Thick | Ind | Abv |
|---|---|---|---|---|
| 1 | 110.195 | 20.54 | 1.497 | 81.6 |
| 2 | -649.833 | 0.50 | | |
| 3 | 125.173 | 11.15 | 1.497 | 81.6 |
| 4 | 443.518 | 3.52 | | |
| 5 | -945.974 | 5.00 | 1.7561 | 45.7 |
| 6 | 344.563 | 25.00 | | |
| 7 | 82.726 | 4.30 | 1.744 | 44.9 |
| 8 | 43.482 | 17.12 | 1.497 | 81.6 |
| 9 | 194.470 | 19.88 | | |
| 10 | 218.281 | 4.25 | 1.80518 | 25.5 |
| 11 | -218.281 | 2.30 | 1.883 | 40.8 |
| 12 | 72.759 | 32.73 | | |
| ST | Infinity | 4.00 | | |
| 14 | 90.471 | 4.70 | 1.84666 | 23.8 |
| 15 | -76.104 | 2.00 | 1.69895 | 30.1 |
| 16 | 45.436 | 6.03 | | |
| 17 | -76.147 | 2.00 | 1.48749 | 70.4 |
| 18 | 170.130 | 4.50 | | |
| 19 | 302.703 | 7.80 | 1.81846 | 34.5 |
| 20 | -46.956 | 2.80 | 1.84666 | 23.8 |
| 21 | -195.007 | 5.00 | | |
| 22 | 68.643 | 5.06 | 1.48749 | 70.4 |
| 23 | -308.940 | 5.00 | | |
| 24 | Infinity | 2.00 | 1.5168 | 64.2 |
| 25 | Infinity | 72.69 | | |
| IMG | | | | |

<Fourth Embodiment>

| EFL: 292.00 mm | Fno: 2.88 | 2w: 8.5 |
|---|---|---|

| Surf | Radius | Thick | Ind | Abv |
|---|---|---|---|---|
| 1 | 112.178 | 20.69 | 1.497 | 81.6 |
| 2 | -574.159 | 0.50 | | |
| 3 | 132.994 | 11.27 | 1.43384 | 95.2 |
| 4 | 413.831 | 4.62 | | |
| 5 | -632.930 | 4.60 | 1.8061 | 40.7 |
| 6 | 471.546 | 31.69 | | |
| 7 | 84.140 | 3.60 | 1.74068 | 46.7 |
| 8 | 44.135 | 15.45 | 1.497 | 81.6 |
| 9 | 198.102 | 20.48 | | |
| 10 | 232.554 | 4.30 | 1.80518 | 25.5 |
| 11 | -182.639 | 2.30 | 1.883 | 40.8 |
| 12 | 74.897 | 42.17 | | |
| ST | Infinity | 8.00 | | |
| 14 | 119.715 | 4.84 | 1.84541 | 27 |
| 15 | -63.058 | 2.67 | 1.69958 | 34.2 |
| 16 | 59.449 | 7.11 | | |
| 17 | -92.408 | 1.50 | 1.49 | 70.1 |

-continued

| Surf | Radius | Thick | Ind | Abv |
|---|---|---|---|---|
| 18 | 87.060 | 5.37 | | |
| 19 | 130.295 | 7.13 | 1.83954 | 37.9 |
| 20 | −42.709 | 1.70 | 1.83498 | 24 |
| 21 | −197.835 | 0.80 | | |
| 22 | 63.883 | 5.52 | 1.497 | 81.6 |
| 23 | 291.663 | 4.11 | | |
| 24 | Infinity | 2.00 | 1.5168 | 64.2 |
| 25 | Infinity | 72.61 | | |
| IMG | | | | |

<Fifth Embodiment>

| EFL: 292.00 mm | Fno: 2.88 | 2w: 8.5 |
|---|---|---|

| Surf | Radius | Thick | Ind | Abv |
|---|---|---|---|---|
| 1 | 111.586 | 20.59 | 1.497 | 81.6 |
| 2 | −618.791 | 0.50 | | |
| 3 | 130.781 | 11.30 | 1.43384 | 95.2 |
| 4 | 415.534 | 4.63 | | |
| 5 | −699.079 | 4.60 | 1.8061 | 40.7 |
| 6 | 427.912 | 32.01 | | |
| 7 | 84.218 | 3.57 | 1.794 | 39.9 |
| 8 | 43.881 | 15.96 | 1.4986 | 73.2 |
| 9 | 196.477 | 20.50 | | |
| 10 | 221.892 | 4.30 | 1.80518 | 25.5 |
| 11 | −188.722 | 2.30 | 1.883 | 40.8 |
| 12 | 74.034 | 42.24 | | |
| ST | Infinity | 8.41 | | |
| 14 | 117.292 | 4.98 | 1.84692 | 26.7 |
| 15 | −63.628 | 2.83 | 1.69971 | 33 |
| 16 | 58.393 | 6.80 | | |
| 17 | −91.825 | 1.50 | 1.49062 | 70 |
| 18 | 87.832 | 5.00 | | |
| 19 | 128.075 | 6.20 | 1.84045 | 43.5 |
| 20 | −54.473 | 1.70 | 1.83433 | 24.1 |
| 21 | −196.673 | 0.93 | | |
| 22 | 63.033 | 5.73 | 1.49826 | 67.9 |
| 23 | 271.123 | 4.23 | | |
| 24 | Infinity | 2.00 | 1.5168 | 64.2 |
| 25 | Infinity | 72.74 | | |
| IMG | | | | |

<Sixth Embodiment>

| EFL: 292.00 mm | Fno: 2.88 | 2w: 8.4 |
|---|---|---|

| Surf | Radius | Thick | Ind | Abv |
|---|---|---|---|---|
| 1 | 112.353 | 20.16 | 1.497 | 81.6 |
| 2 | −613.884 | 0.50 | | |
| 3 | 131.249 | 11.12 | 1.456 | 90.3 |
| 4 | 423.030 | 4.39 | | |
| 5 | −739.986 | 4.60 | 1.8061 | 40.7 |
| 6 | 417.289 | 31.45 | | |
| 7 | 84.948 | 3.60 | 1.74265 | 46.6 |
| 8 | 44.160 | 15.93 | 1.497 | 81.6 |
| 9 | 198.702 | 20.27 | | |
| 10 | 227.202 | 4.30 | 1.80518 | 25.5 |
| 11 | −181.577 | 2.30 | 1.883 | 40.8 |
| 12 | 74.365 | 43.23 | | |

-continued

| Surf | Radius | Thick | Ind | Abv |
|---|---|---|---|---|
| ST | Infinity | 8.00 | | |
| 14 | 118.788 | 4.82 | 1.84536 | 26 |
| 15 | −63.528 | 2.50 | 1.69915 | 32.9 |
| 16 | 58.760 | 6.45 | | |
| 17 | −92.710 | 1.50 | 1.4875 | 70.4 |
| 18 | 87.412 | 5.89 | | |
| 19 | 125.439 | 7.19 | 1.83821 | 37.9 |
| 20 | −43.728 | 1.70 | 1.83916 | 23.9 |
| 21 | −209.425 | 0.80 | | |
| 22 | 66.167 | 5.83 | 1.497 | 81.6 |
| 23 | 360.486 | 4.00 | | |
| 24 | Infinity | 2.00 | 1.5168 | 64.2 |
| 25 | Infinity | 72.51 | | |
| IMG | | | | |

<Seventh Embodiment>

| EFL: 292.00 mm | Fno: 2.88 | 2w: 8.5 |
|---|---|---|

| Surf | Radius | Thick | Ind | Abv |
|---|---|---|---|---|
| 1 | 110.392 | 20.81 | 1.497 | 81.6 |
| 2 | −688.034 | 0.81 | | |
| 3 | 119.386 | 10.83 | 1.497 | 81.6 |
| 4 | 411.406 | 4.23 | | |
| 5 | −921.004 | 4.60 | 1.8061 | 40.7 |
| 6 | 367.650 | 31.18 | | |
| 7 | 82.601 | 3.51 | 1.74513 | 45.1 |
| 8 | 43.227 | 0.81 | | |
| 9 | 43.527 | 15.66 | 1.497 | 81.6 |
| 10 | 191.538 | 19.50 | | |
| 11 | 233.953 | 4.01 | 1.80518 | 25.5 |
| 12 | −233.953 | 2.30 | 1.883 | 40.8 |
| 13 | 74.252 | 38.08 | | |
| ST | Infinity | 7.10 | | |
| 15 | 99.786 | 4.99 | 1.84666 | 23.8 |
| 16 | −73.967 | 1.70 | 1.69874 | 31 |
| 17 | 50.281 | 7.20 | | |
| 18 | −79.716 | 1.65 | 1.48749 | 70.4 |
| 19 | 140.614 | 6.50 | | |
| 20 | 227.752 | 7.80 | 1.83938 | 35.7 |
| 21 | −38.917 | 1.70 | 1.82865 | 24.3 |
| 22 | −190.601 | 1.00 | | |
| 23 | 64.992 | 4.91 | 1.48749 | 70.4 |
| 24 | −9959.093 | 5.00 | | |
| 25 | Infinity | 2.00 | 1.5168 | 64.2 |
| 26 | Infinity | 72.51 | | |
| IMG | | | | |

<Eighth Embodiment>

| EFL: 292.00 mm | Fno: 2.88 | 2w: 8.5 |
|---|---|---|

| Surf | Radius | Thick | Ind | Abv |
|---|---|---|---|---|
| 1 | 110.536 | 20.78 | 1.497 | 81.6 |
| 2 | −686.687 | 0.78 | | |
| 3 | 129.276 | 10.82 | 1.497 | 81.6 |
| 4 | 412.243 | 4.21 | | |
| 5 | −933.970 | 4.59 | 1.8061 | 40.7 |
| 6 | 315.253 | 31.15 | | |
| 7 | 82.580 | 3.51 | 1.74507 | 45.3 |
| 8 | 43.220 | 0.60 | | |

15
-continued

| Surf | Radius | Thick | Ind | Abv |
|---|---|---|---|---|
| 9 | 43.476 | 15.66 | 1.497 | 81.6 |
| 10 | 186.956 | 19.50 | | |
| 11 | 237.094 | 4.02 | 1.80518 | 25.5 |
| 12 | −208.270 | 2.30 | 1.883 | 40.8 |
| 13 | 75.168 | 38.07 | | |
| ST | Infinity | 7.14 | | |
| 15 | 99.896 | 5.00 | 1.84666 | 23.8 |
| 16 | −73.466 | 1.70 | 1.6984 | 30.2 |
| 17 | 50.478 | 7.50 | | |
| 18 | −87.011 | 1.65 | 1.48749 | 70.4 |
| 19 | 120.803 | 6.32 | | |
| 20 | 186.503 | 8.20 | 1.83989 | 36.2 |
| 21 | −43.833 | 1.70 | 1.82806 | 24.2 |
| 22 | −228.821 | 0.80 | | |
| 23 | 64.936 | 5.05 | 1.48749 | 70.4 |
| 24 | −14700.045 | 5.00 | | |
| 25 | Infinity | 2.00 | 1.5168 | 64.2 |
| 26 | Infinity | 72.57 | | |
| IMG | | | | |

<Ninth Embodiment>

| EFL: 292.00 mm | Fno: 2.88 | 2w: 8.5 |
|---|---|---|

| Surf | Radius | Thick | Ind | Abv |
|---|---|---|---|---|
| 1 | 114.532 | 20.93 | 1.497 | 81.6 |
| 2 | −495.577 | 2.49 | | |
| 3 | 137.512 | 11.23 | 1.497 | 81.6 |
| 4 | 668.709 | 4.09 | | |
| 5 | −566.255 | 4.59 | 1.8555 | 28.6 |
| 6 | 364.350 | 29.51 | | |
| 7 | 84.751 | 3.60 | 1.744 | 44.9 |
| 8 | 54.503 | 2.00 | | |
| 9 | 61.005 | 13.28 | 1.497 | 81.6 |
| 10 | 326.112 | 19.97 | | |
| 11 | 451.780 | 4.30 | 1.84666 | 23.8 |
| 12 | −125.579 | 2.20 | 1.883 | 40.8 |
| 13 | 83.855 | 36.40 | | |
| ST | Infinity | 10.01 | | |
| 15 | 148.270 | 4.56 | 1.85953 | 28 |
| 16 | −62.155 | 1.50 | 1.68924 | 41.8 |
| 17 | 49.322 | 7.50 | | |
| 18 | −58.162 | 1.50 | 1.48749 | 70.4 |
| 19 | 800.000 | 6.00 | | |

16
-continued

| Surf | Radius | Thick | Ind | Abv |
|---|---|---|---|---|
| 20 | 750.000 | 8.20 | 1.80963 | 37.8 |
| 21 | −34.469 | 2.00 | 1.84424 | 23.8 |
| 22 | −112.593 | 1.00 | | |
| 23 | 77.159 | 5.36 | 1.48749 | 70.4 |
| 24 | −200.000 | 5.00 | | |
| 25 | Infinity | 2.00 | 1.5168 | 64.2 |
| 26 | Infinity | 72.53 | | |
| IMG | | | | |

<Tenth Embodiment>

| EFL: 292.00 mm | Fno: 2.88 | 2w: 8.5 |
|---|---|---|

| Surf | Radius | Thick | Ind | Abv |
|---|---|---|---|---|
| 1 | 600.000 | 7.97 | 1.5168 | 64.2 |
| 2 | −1400.000 | 0.50 | | |
| 3 | 116.000 | 18.55 | 1.497 | 81.6 |
| 4 | −1370.000 | 0.50 | | |
| 5 | 137.081 | 10.56 | 1.497 | 81.6 |
| 6 | 451.248 | 2.80 | | |
| 7 | −5722.858 | 4.59 | 1.80574 | 35.1 |
| 8 | 187.530 | 34.64 | | |
| 9 | 94.109 | 3.60 | 1.74399 | 44.9 |
| 10 | 61.989 | 2.00 | | |
| 11 | 70.563 | 12.56 | 1.497 | 81.6 |
| 12 | 580.694 | 19.80 | | |
| 13 | 450.438 | 4.28 | 1.84666 | 23.8 |
| 14 | −131.451 | 2.20 | 1.883 | 40.8 |
| 15 | 89.126 | 37.30 | | |
| STO | Infinity | 10.00 | | |
| 17 | 135.623 | 4.72 | 1.84799 | 24.2 |
| 18 | −67.143 | 1.50 | 1.65567 | 33.1 |
| 19 | 47.626 | 7.50 | | |
| 20 | −60.909 | 1.50 | 1.48749 | 70.4 |
| 21 | 263.532 | 6.00 | | |
| 22 | 532.759 | 8.18 | 1.80883 | 33.6 |
| 23 | −30.639 | 2.00 | 1.84655 | 23.8 |
| 24 | −126.535 | 1.00 | | |
| 25 | 77.848 | 5.63 | 1.48749 | 70.4 |
| 26 | −155.014 | 5.00 | | |
| 27 | Infinity | 2.00 | 1.5168 | 64.2 |
| 28 | Infinity | 72.53 | | |
| IMG | | | | |

| | First embodiment | Second embodiment | Third embodiment | Fourth embodiment | Fifth embodiment | Sixth embodiment | Seventh embodiment | Eighth embodiment | Ninth embodiment | Tenth embodiment |
|---|---|---|---|---|---|---|---|---|---|---|
| V(G1) > 70 | 3 lenses | 3 lenses | 3 lenses | 3 lenses | 3 lenses | 3 lenses | 3 lenses | 3 lenses | 3 lenses | 3 lenses |
| 150 < φF | 186.5 | 186.0 | 187.8 | 186.5 | 186.2 | 167.3 | 163.6 | 185.2 | 191.5 | 192.7 |
| −0.6 < F/f31 < | −0.407 | −0.502 | −0.247 | −0.403 | −0.423 | −0.398 | −0.307 | −0.317 | −0.33 | −0.331 |
| 0.4 < F1/F < | 0.577 | 0.562 | 0.544 | 0.591 | 0.598 | 0.59 | 0.575 | 0.577 | 0.536 | 0.553 |
| 0.15 < |F1*F2/F| < 0.30 | 0.228 | 0.206 | 0.215 | 0.235 | 0.239 | 0.234 | 0.227 | 0.229 | 0.206 | 0.229 |
| 0.6 < F3/F < | 0.699 | 0.722 | 0.811 | 0.638 | 0.638 | 0.633 | 0.659 | 0.663 | 0.671 | 0.69 |
| −4.0 < m31 < | −1.665 | −1.342 | −3.24 | −1.591 | −1.486 | −1.622 | −2.276 | −2.192 | −2.386 | −2.387 |
| −0.6 < m32 < | −0.407 | −0.502 | −0.247 | −0.403 | −0.423 | −0.398 | −0.307 | −0.317 | −0.33 | −0.331 |

-continued

|  | First embodiment | Second embodiment | Third embodiment | Fourth embodiment | Fifth embodiment | Sixth embodiment | Seventh embodiment | Eighth embodiment | Ninth embodiment | Tenth embodiment |
|---|---|---|---|---|---|---|---|---|---|---|
| −0.4 < Fair/F< | −0.27 | −0.238 | −0.226 | −0.29 | −0.286 | −0.289 | −0.246 | −0.253 | −0.218 | −0.224 |
| 0.7 < Fair/F31 < 1.4 | 1.02 | 0.999 | 0.842 | 1.085 | 1.071 | 1.081 | 0.897 | 0.924 | 0.914 | 0.939 |

The telephoto lens system according to an embodiment includes a vibration correction lens group for correcting vibration and thus a subject can be photographed having increased image quality. The telephoto lens system according to the current embodiment of the present invention may be used in digital still cameras that use a solid-state image sensing device such as a CCD or a CMOS or in photographing devices such as video cameras and portable terminal devices.

Figure 4:
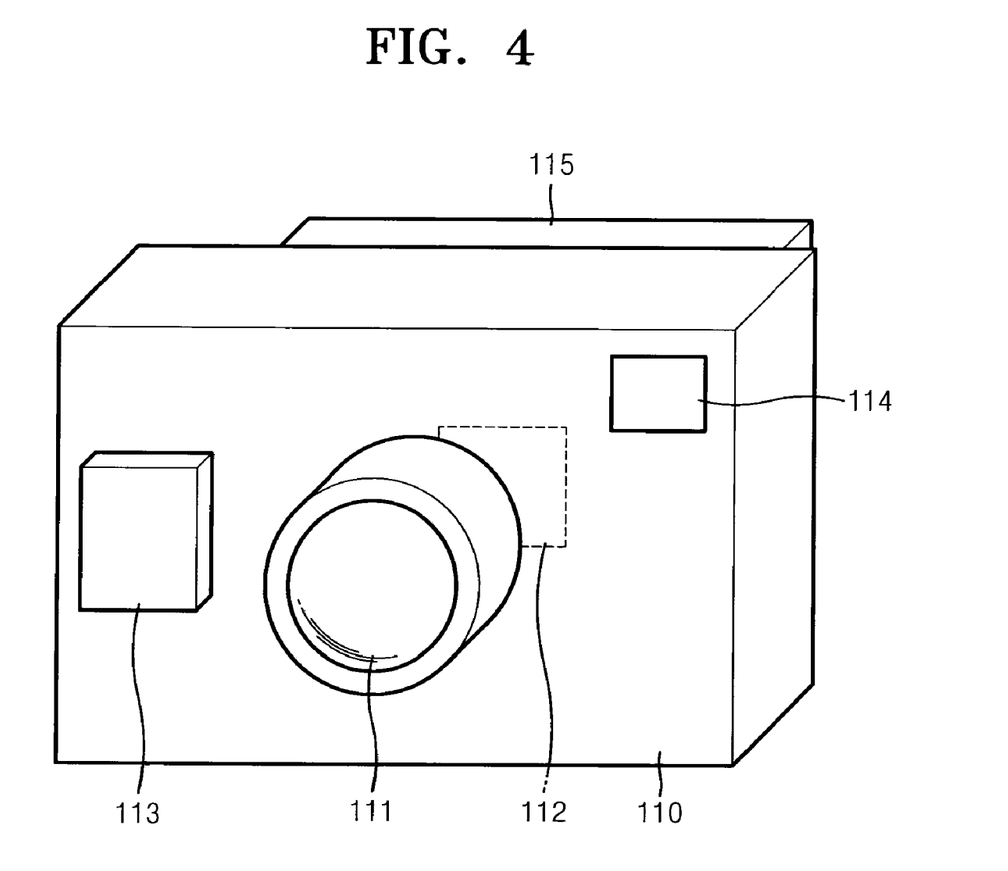
FIG. 4 is a schematic view illustrating a photographing device according to another embodiment of the invention.

FIG. 4 is a schematic view illustrating a photographing device including a telephoto lens system according to an embodiment of the invention. The photographing device includes a telephoto lens system 111 described above with reference to one of the embodiments, and an imaging sensor 112 receiving light that is captured by the telephoto lens system 111. The photographing device may include a writing unit 113 on which data corresponding to a subject image that is photo-electrically converted from the imaging sensor 112 may be written, and a finder 114 for observing the subject. Also, a liquid crystal display panel 115 on which the subject image is displayed may be included. However, the photographing device illustrated in FIG. 4 is an example, and telephoto lens system according to an embodiment of the invention may also be applied to other various optical devices than a camera. As described above, by applying the telephoto lens system according to an embodiment of the invention to photographing devices such as a digital camera, a compact optical device capable of photographing a subject at a far distance can be realized.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A telephoto lens system comprising a first lens group having a positive refractive power, a second lens group having a negative refractive power, and a third lens group having a positive refractive power that are sequentially disposed from an object side,
   wherein the second lens group performs focusing, and the third lens group includes a front lens group having a negative refractive power and a back lens group having a positive refractive power, and vibration correction is performed by moving the front lens group of the third lens group in a direction perpendicular to the optical axis,
   wherein the first lens group includes at least three lenses having a positive refractive power, and the at least three lenses having a positive refractive power satisfy the conditions below $V(G1) \geq 70$, $150 < \phi FNO < 400$, where V(G1) denotes an Abbe number of one of the lenses having a positive refractive power included in the first lens group, $\phi$ denotes the effective diameter of the lens disposed closest to the image side among the lenses having a positive refractive power, and FNO denotes an F-Number of the overall telephoto lens system.

2. The telephoto lens system of claim 1, wherein the first lens group, the second lens group, and the third lens group satisfy the condition below $-0.6 < F/f31 < -0.2$, where F is the focal length of the overall telephoto lens system, and f31 is the combined focal length of the first lens group, the second lens group and the front lens group of the third lens group.

3. The telephoto lens system of claim 1, wherein the first lens group and the second lens group satisfy the conditions below $0.4 < F1/F < 0.7$ $0.15 < |F1*F2/F| < 0.30$, where F is the focal length of the overall telephoto lens system, F1 is the focal length of the first lens group, and F2 is the focal length of the second lens group.

4. The telephoto lens system of claim 3, wherein the third lens group satisfies the condition below $0.6 < F3/F < 0.9$, where F is the focal length of the overall telephoto lens system, and F3 is the focal length of the third lens group.

5. The telephoto lens system of claim 1, wherein the third lens group satisfies the condition below $0.6 < F3/F < 0.9$, where F is the focal length of the overall telephoto lens system, and F3 is the focal length of the third lens group.

6. The telephoto lens system of claim 1, wherein the front lens group of the third lens group satisfies the condition below $-4.0 < m31 < -0.7$, where m31 is the magnification of the front lens group of the third lens group with respect to an infinite object distance.

7. The telephoto lens system of claim 6, wherein the back lens group of the third lens group satisfies the condition below $-0.6 < m32 < -0.1$, where m32 is the magnification of the back lens group of the third lens group with respect to an infinite object distance.

8. The telephoto lens system of claim 1, wherein the front lens group of the third lens group includes at least one positive lens, at least one negative lens, and a biconvex air lens.

9. The telephoto lens system of claim 8, wherein the telephoto lens system satisfies the condition below $$-0.4 < \text{Fair}/F < -0.15,$$

where Fair is the focal length of the biconvex air lens, and F is the focal length of the overall telephoto lens system.

10. The telephoto lens system of claim 8, wherein the telephoto lens system satisfies the condition below $$0.7 < \text{Fair}/F31 < 1.4,$$

where Fair is the focal length of the biconvex air lens, and F31 is the focal length of the front lens group of the third lens group.

11. The telephoto lens system of claim 1, wherein the back lens group of the third lens group includes at least one positive lens and at least one negative lens.

12. The telephoto lens system of claim 11, wherein the telephoto lens system satisfies the condition below $$30 < Vp(G32) - Vn(G32) < 60,$$

where Vp(G32) is an Abbe number of the at least one positive lens of the back lens group of the third lens group, and Vn(G32) is an Abbe number of the at least one negative lens of the back lens group of the third lens group.

13. A telephoto lens system comprising a first lens group having a positive refractive power, a second lens group having a negative refractive power, and a third lens group having a positive refractive power that are sequentially disposed from an object side,
   wherein the second lens group performs focusing, and the third lens group includes a front lens group having a negative refractive power and a back lens group having a positive refractive power, and vibration correction is performed by moving the front lens group of the third lens group in a direction perpendicular to the optical axis,
   wherein the first lens group includes at least three lenses having a positive refractive power, and the at least three lenses having a positive refractive power satisfy the condition below $$-0.6 < F/f31 < -0.2,$$

where F is the focal length of the overall telephoto lens system, and f31 is the combined focal length of the first lens group, the second lens group and the front lens group of the third lens group.

14. The telephoto lens system of claim 13, wherein the first lens group and the second lens group satisfy the conditions below $$0.4 < F1/F < 0.7$$

$$0.15 < |F1*F2/F| < 0.30,$$

where F is the focal length of the overall telephoto lens system, F1 is the focal length of the first lens group, and F2 is the focal length of the second lens group.

15. The telephoto lens system of claim 14, wherein the third lens group satisfies the condition below $$0.6 < F3/F < 0.9,$$

where F is the focal length of the overall telephoto lens system, and F3 is the focal length of the third lens group.

16. The telephoto lens system of claim 13, wherein the third lens group satisfies the condition below $$0.6 < F3/F < 0.9,$$

where F is the focal length of the overall telephoto lens system, and F3 is the focal length of the third lens group.

17. The telephoto lens system of claim 13, wherein the front lens group of the third lens group satisfies the condition below $$-4.0 < m31 < -0.7,$$

where m31 is the magnification of the front lens group of the third lens group with respect to an infinite object distance.

18. The telephoto lens system of claim 17, wherein the back lens group of the third lens group satisfies the condition below $$-0.6 < m32 < -0.1,$$

where m32 is the magnification of the back lens group of the third lens group with respect to an infinite object distance.

19. The telephoto lens system of claim 13, wherein the front lens group of the third lens group includes at least one positive lens, at least one negative lens, and a biconvex air lens, and the telephoto lens system satisfies the condition below $$-0.4 < \text{Fair}/F < -0.15,$$

where Fair is the focal length of the air lens.

20. The telephoto lens system of claim 19, wherein the telephoto lens system satisfies the condition below $$0.7 < \text{Fair}/F31 < 1.4,$$

where Fair is the focal length of the biconvex air lens, and F31 is the focal length of the front lens group of the third lens group.

21. A photographing device comprising:
   a telephoto lens system; and
   an imaging sensor receiving an image formed by the telephoto lens system,
   wherein the telephoto lens system comprises a first lens group having a positive refractive power, a second lens group having a negative refractive power, and a third lens group having a positive refractive power that are sequentially disposed from an object side,
   wherein the second lens group performs focusing, and the third lens group includes a front lens group having a negative refractive power and a back lens group having a positive refractive power, and vibration correction is performed by moving the front lens group of the third lens group in a direction perpendicular to the optical axis,
   wherein the first lens group includes at least three lenses having a positive refractive power, and the at least three lenses having a positive refractive power satisfy the conditions below $$V(G1) \geq 70,$$

$$150 < \phi \text{FNO} < 400,$$

where V(G1) denotes an Abbe number of one of the lens having a positive refractive power included in the first lens group, $\phi$ denotes the effective diameter of the lens disposed closest to the image side among the lenses having a positive refractive power, and FNO denotes an F-Number of the overall telephoto lens system.

22. A photographing device comprising:
   a telephoto lens system; and
   an imaging sensor receiving an image formed by the telephoto lens system, wherein the telephoto lens system comprises a first lens group having a positive refractive power, a second lens group having a negative refractive power, and a third lens group having a positive refractive power that are sequentially disposed from an object side, wherein the second lens group performs focusing, and the third lens group includes a front lens group having a negative refractive power and a back lens group having a positive refractive power, and vibration correction is performed by moving the front lens group of the third lens group in a direction perpendicular to the optical axis, wherein the first lens group includes at least three lenses having a positive refractive power, and the first lens group, the second lens group, and the third lens group satisfy the condition below $-0.6<F/f31<-0.2$, where F is the focal length of the overall telephoto lens system, and f31 is the combined focal length of the first lens group, the second lens group and the front lens group of the third lens group.

* * * * *